B. ESTES.
CATTLE GUARD.
APPLICATION FILED FEB. 28, 1912.
1,049,468.
Patented Jan. 7, 1913.
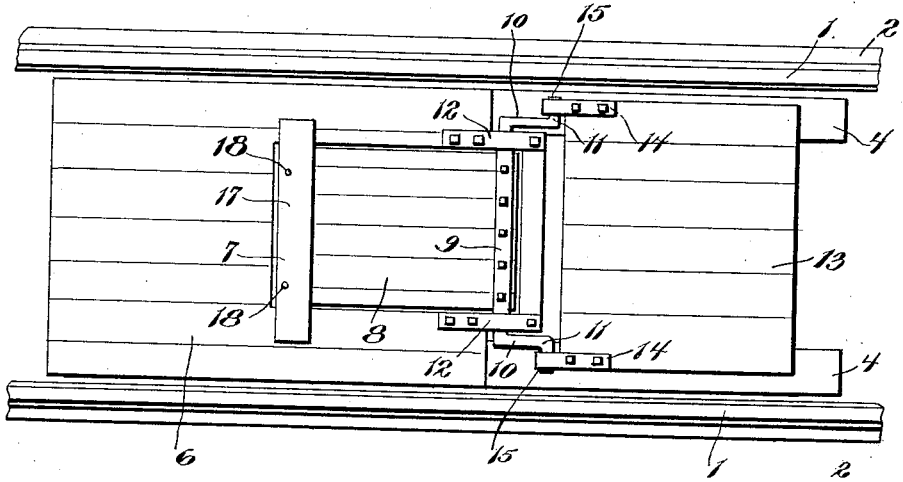
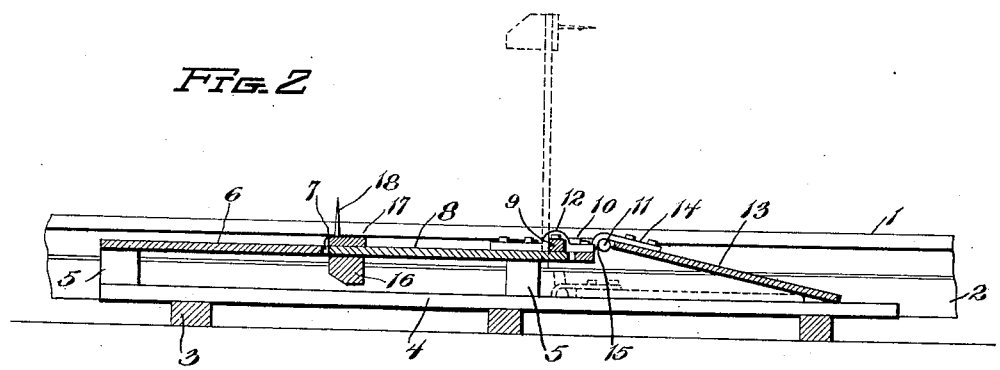
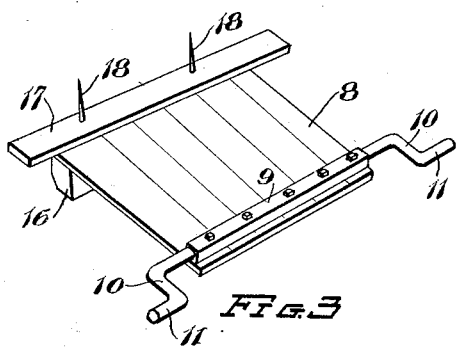
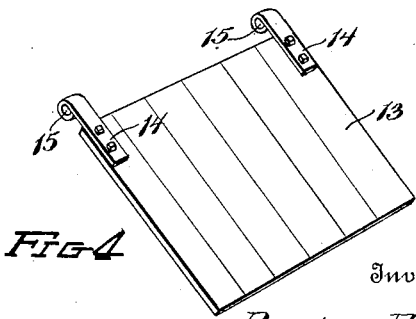
Witnesses
Inventor
Barton Estes.
By Victor J. Evans
Attorney

UNITED STATES PATENT OFFICE.

BARTON ESTES, OF SEATTLE, WASHINGTON.

CATTLE-GUARD.

1,049,468. Specification of Letters Patent. Patented Jan. 7, 1913.

Application filed February 28, 1912. Serial No. 680,378.

*To all whom it may concern:*

Be it known that I, BARTON ESTES, a citizen of the United States, residing at Seattle, in the county of King and State of Washington, have invented new and useful Improvements in Cattle-Guards, of which the following is a specification.

This invention relates to cattle guards for use on railways, and the object in view is to provide what may be termed an automatic cattle guard, the same being so constructed and mounted as to be operable with certainty, by means of the weight of the cattle in attempting to pass over the place where the cattle guard is located.

A further object of the invention is the provision of a cattle guard of such construction that it may be placed between the rails at any desired point, and easily shifted from point to point, as may be required.

With the above and other objects in view, the invention consists in the construction, combination and arrangement of parts, as will be hereinafter more fully described, illustrated in the accompanying drawings, and pointed out in the claims hereunto appended.

In the accompanying drawings: Figure 1 is a plan view of a cattle guard, embodying the present invention. Fig. 2 is a vertical longitudinal section through the same, illustrating the operative position of the parts by dotted lines. Fig. 3 is a detail view of the gate. Fig. 4 is a similar view of the depressible platform.

Referring to the drawings, 1 designates a pair of railway rails mounted upon the usual stringers 2 which are in turn connected by the transverse bars or ties 3.

The cattle guard contemplated in this invention comprises a supporting base, consisting of the parallel bars or bed pieces 4, from which posts 5 extend upwardly, forming a support for a stationary platform 6. This platform is provided with an aperture 7, in which is mounted a tilting gate 8, said gate lying flush with the upper surface of the platform 6 and forming a movable section of the platform. Connected to the outer edge of the gate 8 is a rock shaft 9 provided at its extremities with projecting crank arms 10 which are in turn provided with outwardly and oppositely projecting pintles 11. The rock shaft is journaled in bearings 12 secured to the platform 6 at opposite sides of the tilting gate 8.

13 designates a depressible platform which is normally inclined, as shown in Fig. 2, the lower edge thereof resting on the parallel bars 4, while at the upper edge said depressible platform is provided with lugs 14 having sockets 15, shown in the form of eyes which fit over and rest upon the pintles 11 in such manner that when an animal places his front feet upon the depressible platform 13, the crank arms 10 will be pressed downwardly, and thereby rock the gate upward to a substantially vertical position, in which it will form an obstruction to the further movement of the animal along the railway track. Near its free edge the tilting gate is provided with a weight 16 to insure the return of the tilting gate to its normal horizontal position, while extending across the free end of the gate there is a cleat or cross bar 17 provided with spikes 18 adapted to stick into the front legs of the animal, so as to effectively defeat any attempt of the animal to proceed farther along the railway track. The opposite ends of the cleat project beyond the side edges of the tilting section of the platform, so as to rest upon the stationary part of the platform and sustain the movable platform section flush with the stationary section.

It will be understood from the foregoing description, taken in connection with the accompanying drawings, that the automatic cattle guard hereinabove particularly described is adapted to be placed between the rails and stringers at any desired point in the track, and finds its support upon the usual cross ties or sleepers 3. If desired, the gate structure may be anchored in a fixed position by spiking the frame of the guard to the sleepers or otherwise anchoring the same in any convenient manner.

What is claimed is:

1. A cattle guard, embodying oppositely arranged parallel bed pieces located between the rails, a stationary platform mounted on and connecting said bed pieces, a tilting gate formed by a flush section of said platform, a crank shaft fixedly attached to said gate, and a depressible platform connected with said crank shaft and adapted when depressed to throw the gate into an obstructing position, said depressible platform resting at its outer end on the parallel bed pieces.

2. A cattle guard, embodying oppositely arranged parallel bed pieces located between the rails, a stationary platform mounted on and connecting said bed pieces, a tilting gate formed by a flush section of said platform, a crank shaft fixedly attached to said gate, a depressible platform connected with said crank shaft and adapted when depressed to throw the gate into an obstructing position, said depressible platform resting at its outer end on the parallel bed pieces, and a cleat extending along the free edge of the gate and projecting at its opposite ends beyond the side margins of the gate over the stationary section of the platform.

In testimony whereof I affix my signature in presence of two witnesses.

BARTON ESTES.

Witnesses:
 CHARLES E. McEWEN,
 J. J. GOSS.

---

Copies of this patent may be obtained for five cents each, by addressing the "Commissioner of Patents, Washington, D. C."